(12) United States Patent
Song et al.

(10) Patent No.: US 10,015,484 B2
(45) Date of Patent: Jul. 3, 2018

(54) ADAPTIVE SCAN DEVICE AND METHOD FOR SCANNING THEREOF

(71) Applicant: SK TELECOM CO., LTD., Seoul (KR)

(72) Inventors: Jinhan Song, Seoul (KR); Jeongyeon Lim, Seongnam-si (KR); Kunho Yoo, Seoul (KR); Tae Young Jung, Seoul (KR); Jechang Jeong, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 1114 days.

(21) Appl. No.: 13/932,106

(22) Filed: Jul. 1, 2013

(65) Prior Publication Data

US 2013/0294507 A1   Nov. 7, 2013

Related U.S. Application Data

(63) Continuation of application No. PCT/KR2011/010377, filed on Dec. 30, 2011.

(30) Foreign Application Priority Data

Dec. 30, 2010  (KR) ................ 10-2010-0138536

(51) Int. Cl.
  *H04N 7/12*  (2006.01)
  *H04N 11/02*  (2006.01)
  (Continued)

(52) U.S. Cl.
  CPC ....... *H04N 19/00569* (2013.01); *H04N 19/11* (2014.11); *H04N 19/129* (2014.11); *H04N 19/61* (2014.11)

(58) Field of Classification Search
  CPC .. H04N 19/00569; H04N 19/61; H04N 19/11; H04N 19/129; H04N 19/645
  (Continued)

(56) References Cited

U.S. PATENT DOCUMENTS

| | | | |
|---|---|---|---|
| 2008/0310504 A1* | 12/2008 | Ye | H04N 19/00812 375/240.02 |
| 2009/0273706 A1* | 11/2009 | Tu | H04N 19/132 348/420.1 |
| 2010/0124284 A1* | 5/2010 | Lee | H04N 19/139 375/240.18 |

FOREIGN PATENT DOCUMENTS

| | | |
|---|---|---|
| CN | 101803386 A | 8/2010 |
| KR | 1019960025597 | 7/1996 |

(Continued)

OTHER PUBLICATIONS

International Search Report dated Aug. 1, 2012 for PCT/KR2011/010377.

*Primary Examiner* — Jared Walker
(74) *Attorney, Agent, or Firm* — Hauptman Ham, LLP

(57) ABSTRACT

The present disclosure relates to an adaptive scan apparatus and a method for scanning thereof. The adaptive scan apparatus includes a zero coefficient counter and a scan pattern updater. The scan pattern updater is configured to generate a zero counter corresponding to a prediction mode of a neighboring block of a current block and to update the zero counter corresponding to a position where a coefficient value of the current block is 0 for transformed and quantized data. And the scan pattern updater is configured to update a scan pattern by sequentially arranging generated zero counters updated for the current block from a position of a small value to a position of a large value.

9 Claims, 9 Drawing Sheets

(51) Int. Cl.
*H04N 11/04* (2006.01)
*H04N 19/50* (2014.01)
*H04N 19/129* (2014.01)
*H04N 19/61* (2014.01)
*H04N 19/11* (2014.01)

(58) Field of Classification Search
USPC .................................................. 375/240.02
See application file for complete search history.

(56) References Cited

FOREIGN PATENT DOCUMENTS

KR     1020070016663     2/2007
WO      2008128380     10/2008

\* cited by examiner ns have been increased in addition to text and voice communications. The inventor(s) has noted that a conventional text-centered communication scheme is insufficient to satisfy various consumers' desires and thus, there are increasing multimedia services that may include various types of information such as texts, images, music, and the like. The amount of multimedia data is huge and thus, the multimedia data requires a large-capacity storage medium and requires a wide bandwidth for transmission. The inventor(s) has, therefore, experienced that, to transmit multimedia data including texts, images, and audio data, a compression encoding scheme may be required.

ADAPTIVE SCAN DEVICE AND METHOD FOR SCANNING THEREOF

CROSS-REFERENCE TO RELATED APPLICATION

The present application is a continuation of International Patent Application No. PCT/KR2011/010377, filed Dec. 30, 2011, which is based on and claims priority to Korean Patent Application No. 10-2010-0138536, filed on Dec. 30, 2010. The disclosures of the above-listed applications are hereby incorporated by reference herein in their entirety.

FIELD

The present disclosure relates to an adaptive scan apparatus capable of increasing a compression efficiency of a moving picture by using a scan pattern.

BACKGROUND

The statements in this section merely provide background information related to the present disclosure and may not constitute prior art.

Along with the development of information and communication technology including the Internet, visual communications have been increased in addition to text and voice communications. The inventor(s) has noted that a conventional text-centered communication scheme is insufficient to satisfy various consumers' desires and thus, there are increasing multimedia services that may include various types of information such as texts, images, music, and the like. The amount of multimedia data is huge and thus, the multimedia data requires a large-capacity storage medium and requires a wide bandwidth for transmission. The inventor(s) has, therefore, experienced that, to transmit multimedia data including texts, images, and audio data, a compression encoding scheme may be required.

A basic principle of compressing data is a process of removing of data redundancy factor. Data may be compressed by removing a spatial redundancy such as when the same color or object is repeated in an image, a temporal redundancy as when few changes occur among neighboring frames in a video frame or as when the same note is repeated in an audio signal, or psychovisual redundancy that considers human sight and perception being insensitive to a high frequency.

Among such video compressing methods, interest picks up in H.264 to AVC (Advanced Video Coding) having further improved compression efficiency over MPEG-4 (Moving Picture Experts Group-4). As one of schemes to improve the compression efficiency, H.264 uses directional intra-prediction (hereinafter simply referred to as intra-prediction) to remove a temporal similarity within a frame.

The intra-prediction predicts values of a current sub-block by copying pixels neighboring one sub-block on its upper and left sides in a predetermined direction, and encodes only the differences between pixel values of a current block and pixel values of a prediction block, wherein current subblock means a subblock of the current block. On the other hand, an inter-prediction (a prediction between frames or a temporal prediction) performs predicting area 40 of a frame 20, referring to areas 30 of a frame 10 located at temporally different locations, as shown in FIG. 1. The intra-prediction is complementary to the inter-prediction. In essentials, of the two prediction methods, more advantageous one is selected over the other for the image to be encoded.

According to the intra-prediction according to the conventional H.264 standard, a predicted block of a current block is generated based on another block that has an earlier coding order. Then, a value obtained by subtracting the predicted block from the current block is encoded. With respect to a luminance component, the predicted block is generated by 4×4 block, 8×8 block or 16×16 macroblock unit. There are nine selectable prediction modes for each 4×4 block or 8×8 block, and four selectable prediction modes for each 16×16 block. From among the prediction modes, a video encoder according to H.264 selects a prediction mode that causes the smallest difference between the current block and the predicted block.

As an intra-prediction mode for 4×4 blocks and 8×8 blocks, in the H.264, as shown in FIG. 2, 9 prediction modes including modes having total 8 directionalities (0, 1, 3 to 8) and a DC mode (2) to use an average value of neighboring 8 pixels are used.

In addition, after a difference value between a pixel value predicted by block unit and an original pixel value is frequency transformed and quantized, an intra-prediction method according to a conventional H.264 standard performs entropy encoding to the quantized data by using a zig-zag scan pattern. The inventor(s) has, however, noted that a scanning by a zig-zag pattern might ignore special characteristics in a screen of the remaining data.

SUMMARY

In accordance with some embodiments of the present disclosure, an adaptive scan apparatus comprising a zero coefficient counter and a scan pattern updater. The zero coefficient counter is configured to generate a zero counter corresponding to a prediction mode of a neighboring block of a current block and to update the zero counter corresponding to a position where a coefficient value of the current block is 0 for transformed and quantized data. And the scan pattern updater is configured to update a scan pattern by sequentially arranging generated zero counters updated for the current block from a position of a small value to a position of a large value.

In accordance with some embodiments of the present disclosure, the adaptive scan apparatus is configured to generate one or more zero counters corresponding to prediction modes of one or more neighboring blocks of a current block, determine whether the current block has a coefficient value of 0 for transformed and quantized data and updating the zero counter corresponding to a position where the coefficient is 0, and update a scan pattern by sequentially arranging the zero counters updated for the current block from a position of a small value to a position of a large value.

In accordance with some embodiments of the present disclosure, an intra-prediction coding apparatus comprises an intra predictor, an intra-prediction mode selector, a zero coefficient counter and a scan pattern updater. The intra predictor is configured to predict pixel values of a current block by copying into a predetermined direction with neighboring pixels of at least one neighboring block of the current block. The intra-prediction mode selector is configured to select a prediction mode among one or more prediction modes. The zero coefficient counter is configured to generate a zero counter corresponding to the selected prediction mode of the at least one neighboring block and to update the zero counter corresponding to a position where a coefficient value of the current block is 0 for transformed and quantized data. The scan pattern updater is configured to update a scan pattern by sequentially arranging generated zero counters updated for the current block from a position of a small value to a position of a large value.

DETAILED DESCRIPTION

The present disclosure provides an adaptive scan apparatus capable of increasing a compression efficiency of a moving picture by using a scan pattern adaptively updated according to a probability distribution of quantized remaining data in place of using a known zig-zag scan pattern in intra-prediction coding and/or decoding for increasing the compression efficiency of the moving picture.

Hereinafter, intra-prediction coding and/or decoding apparatus and method and adaptive scan apparatus and method according to embodiments of the present disclosure will be described in detail with reference to the accompanying drawings.

Figure 3:
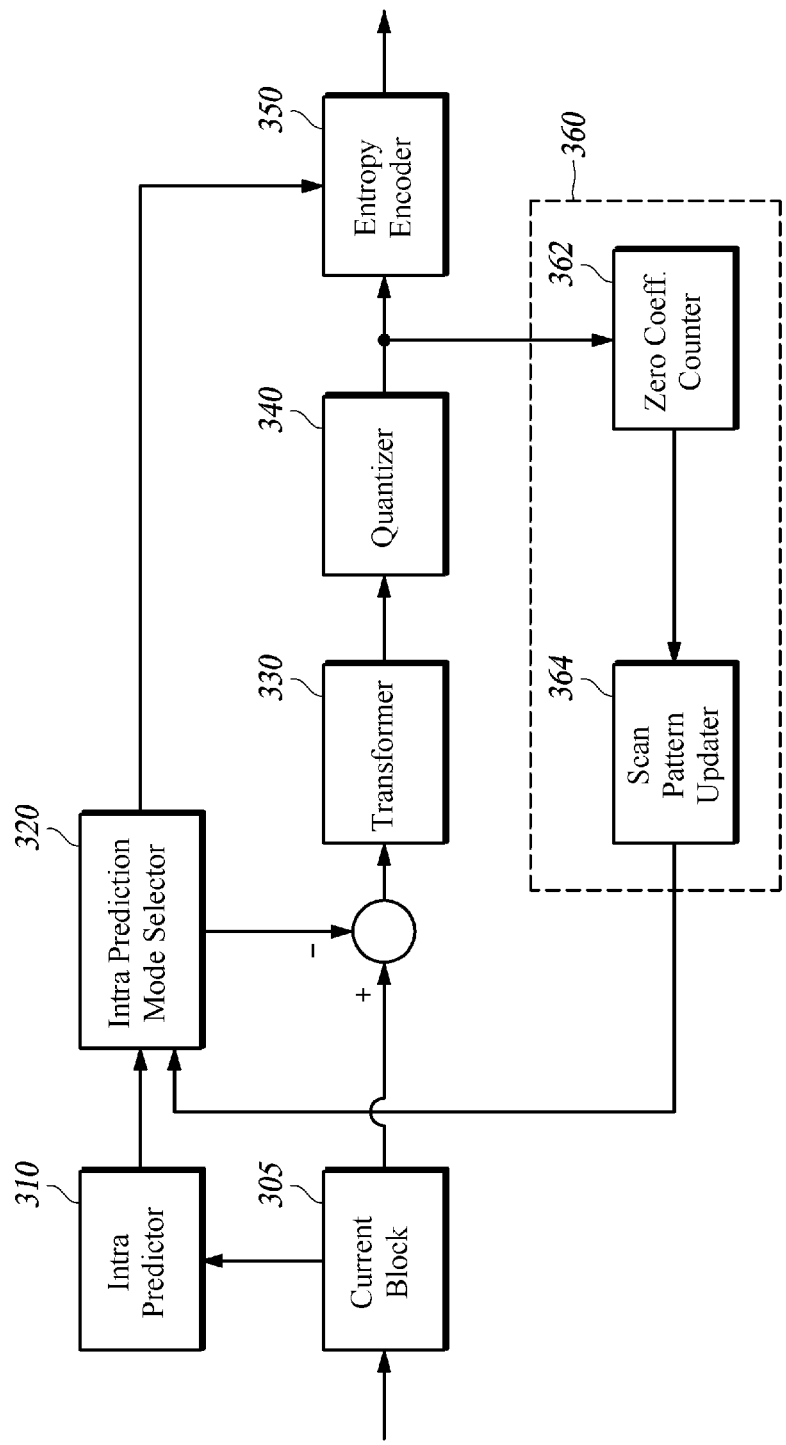
FIG. 3 is a schematic diagram of an adaptive scan apparatus according to at least one embodiment of the present disclosure.

FIG. 3 is a schematic diagram including an adaptive scan apparatus according to at least one embodiment of the present disclosure. FIG. 3 is an intra-prediction coding apparatus including the adaptive scan apparatus. The adaptive scan apparatus can be installed as a part of, or independently from, the intra-prediction coding apparatus.

Figure 1:
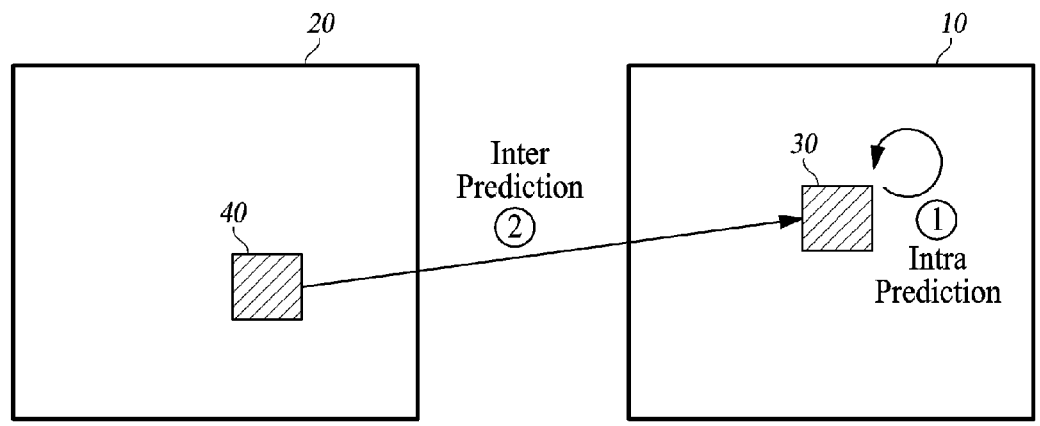
FIG. 1 is a diagram of an inter-prediction.
Figure 2:
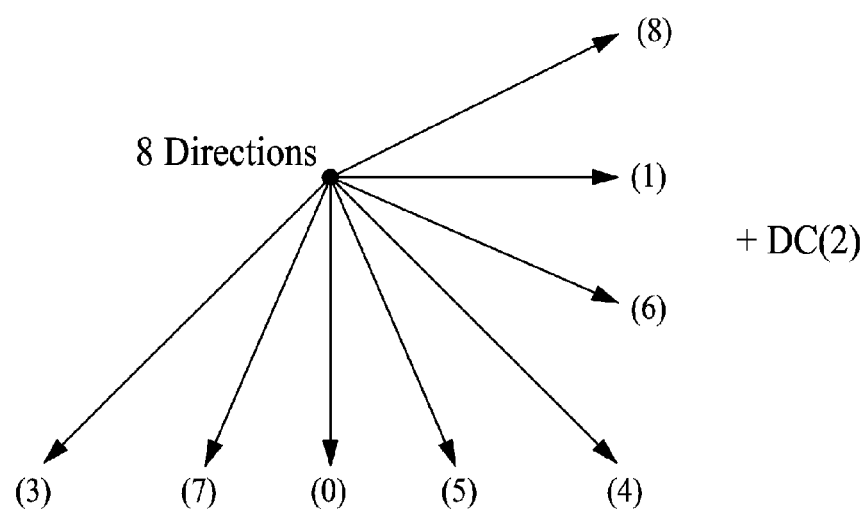
FIG. 2 is a diagram of a directionality of an intra-prediction mode.

Referring to the drawings, an intra predictor 310 can predict pixel values of current blocks 305 by copying into a predetermined direction with neighboring pixels of at least one of left and upper sides (i.e., left and upper blocks, or neighboring blocks) of the current blocks 305. At this time, the intra predictor 310 can predict prediction modes (e.g., modes 0, 1, 3 to 8 in FIG. 2) having a number (8) of directionalities for 4×4 block, as shown in FIG. 2, by using the neighboring pixels of left and upper sides of the current block 305 and predict the pixel values of the current blocks 305 as a number (9) of prediction modes including a prediction mode (a DC mode) using an average value of 8 pixels neighboring to the left and upper sides of the current blocks 305; and an intra-prediction mode selector 320 can select an prediction mode with a minimum encoding cost among these prediction modes. A subtractor generates remaining data (i.e., difference values or residual data) by subtracting prediction data from data of the current block 305 to be transformed by a Transformer 330.

A transformer 330 performs a block based transform or an image based transform for difference values between a prediction value (i.e., a predicted pixel value) by a prediction mode selected from the intra-prediction mode selector 320 and a pixel value of the current block 305. The block based transform may be a discrete cosine transform (DCT), a Karhunen-Loeve transform (KLT), a singular value decomposition (SVD) transform or the like; and the image based transform may be a discrete wavelet transform (DWT) (or wavelet) transform.

A quantizer 340 quantizes data corresponding to the pixel values transformed by the transformer 330 into an integer level (a digital level). A quantization method may be a method such as a scalar quantization to round off the number having the decimal point to the nearest integer and a vector quantization to replace an input data set with a value (codeword) and replace each codeword with an approximate value of an original input data set in a decoder or the like.

In the intra-prediction according to the known H.264 standard, after the data quantized by the quantizer 340 is rearranged by using a zig-zag scan pattern, an entropy coding is performed through an entropy encoder 350. That is, an entropy encoder performs entropy coding for the quantized data based on the selected prediction mode. By the way, such zig-zag scan pattern ignores the directional characteristics of the data quantized according to the prediction mode as described above. The entropy coding is a scheme that encodes a given set of symbols with the minimum number of bits to represent them.

In this regard, an adaptive scan apparatus 360 in accordance with embodiments of the present invention can increase the moving picture compression efficiency by adaptively using the scan patterns according to the directional characteristics of the data quantized by the quantizer 340. Hereinafter, the adaptive scan apparatus 360 in accordance with embodiments of the present invention will be described in detail.

An entropy coding due to the entropy encoder 350 has a high compression efficiency as a remaining data (or residual data, hereinafter referred to as 'remaining data' for description convenience) has many series of zero coefficients scanned by a scanning technique and the compression implementation of the entropy encoder 350 becomes increased according to the number of continuous zero coefficients.

The remaining data transformed and quantized by the transformer 330 and the quantizer 340 have many zero coefficients sporadically; and, since the intra-prediction is a directional prediction, these remaining data also have the directional characteristics according to the intra-prediction mode selected by the intra-prediction mode selector 320. Accordingly, the scan pattern has to rearrange the zero coefficients efficiently and adaptively according to the direction of the intra-prediction mode.

The adaptive scan apparatus 360 in accordance with embodiments of the present invention can update the scan patterns according to a probability distribution functions (PDFs) of the quantized coefficients of the previous macro blocks in order to increase the efficiency of the entropy coding, wherein a previous macro block includes one or more of upper or left blocks (4×4 block, 8×8 block, or 16×16 block) of the current block. In order to this, the adaptive scan apparatus 360 in accordance with embodiments of the present invention can include a zero coefficient counter 362 and a scan pattern updater 364.

The zero coefficient counter 362 generates a zero counter by frame or slice unit during an intra-prediction, in this case, 9×9 (i.e., 81) zero counters for the 4×4 block and the 8×8 block may be generated since the zero counters are independently generated for the each intra-prediction mode of the upper blocks and the left blocks of the current block 305. And also, the 4×4 (i.e., 16) zero counters may be generated for the 16×16 block.

After the intra-prediction, although a spatial correlation of the mode direction is finished, the spatial correlation of different directions may be remained. Further, the neighboring blocks have probabilities to have the prediction mode equal to the current block. Accordingly, it is preferable to use the information of the neighboring blocks for reducing the redundancy. The adaptive scan apparatus 360 uses the zero counters for updating the scan patterns.

The zero coefficient counter 362 can count the zero coefficients of the current block by using the zero counters $Z[u][l][m, n]$ for the $k^{th}$ 4×4 block, 8×8 block or 16×16 block in the macro block and the prediction mode information of the neighboring blocks, wherein a macro block is a processing unit in image encoding. Herein, the u and l of the $Z[u][l][m, n]$ represent the prediction modes in the picture used in the upper blocks and the left blocks of each current block; and, the m and n represent the positions of the current encoded blocks. That is, the $Z[u][l][m, n]$ represents the zero counter of the m and n positions for the cases that the upper block of the current block is encoded by using the $u^{th}$ intra-prediction mode and the left block of the current block is encoded by using the $l^{th}$ intra-prediction mode (herein, the u and l=0, 1, 2, . . . , 8 for the 4×4 block and the 8×8 block and the u and l=0, 1, 2, 3 for the 16×16 block).

The zero coefficient counter 362 increase the zero counter of the position that the coefficient value of the block is 0 for the current block by 1, after encoding the current block 305.

After the scan pattern updater 364 updates the zero counter for one block, it can update the scan pattern in regular sequence from a position having a small value to a position having a large value by using the updated zero counter. The number of whole cases of the scan patterns for a zero counter $Z_2$ of the specific modes 'u' and 'l' may be 81 for the 4×4 block and the 8×8 block, and 16 for the 16×16 block. That is, the patterns may be changed according to the 9 modes of the left blocks and the 9 modes of the upper block (for the 4×4 block or the 8×8 block) or the 4 modes of the left block and the 4 modes of the upper block (for the 16×16 block. Also, the changed scan pattern may be used in an RD (Rate-Distortion) optimization process in the following macro block and the scan pattern changed according to the $Z_2$ may be used in the RD optimization process.

If the prediction mode information of the neighboring blocks such as the blocks placed at boundaries of the upper side and the left side of the frame cannot be used, the scan pattern updater 364 can perform the scanning as the known zig-zag scan pattern for the corresponding blocks. And also, after the zero counter is initialized, it can also scan the block first came out by the zig-zag scan and the rest zero counters may be updated in accordance with embodiments of the present invention. The updated scan patterns are applied to the blocks corresponding to the following order, the zero counters and the scan patterns are initialized by slice unit and the counted values are accumulated until initialized. Other components of the adaptive scan apparatus 300, such as the intra predictor 310, the intra-prediction mode selector 320, the transformer 330, the quantizer 340, entropy encoder 350, and the adaptive scan apparatus 360 are implemented by one or more processors and/or application-specific integrated circuits (ASICs). Other sub components of the adaptive scan apparatus 360, such as the zero coefficient counter 362 and the scan pattern updater 364 are implemented by one or more processors and/or application-specific integrated circuits (ASICs).

Figure 4:
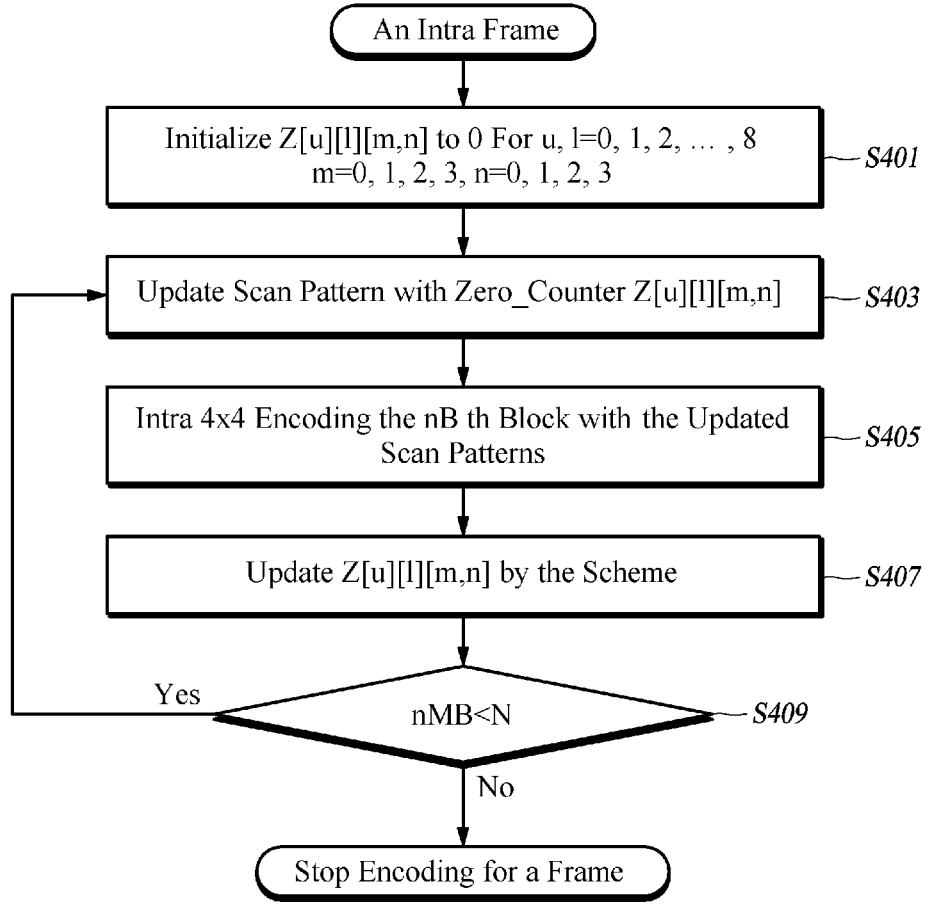
FIG. 4 is a flowchart of an adaptive scan method by an adaptive scan apparatus according to at least another embodiment of the present disclosure.

FIG. 4 is a flowchart of an adaptive scan method according to at least another embodiment of the present disclosure.

Figure 5:
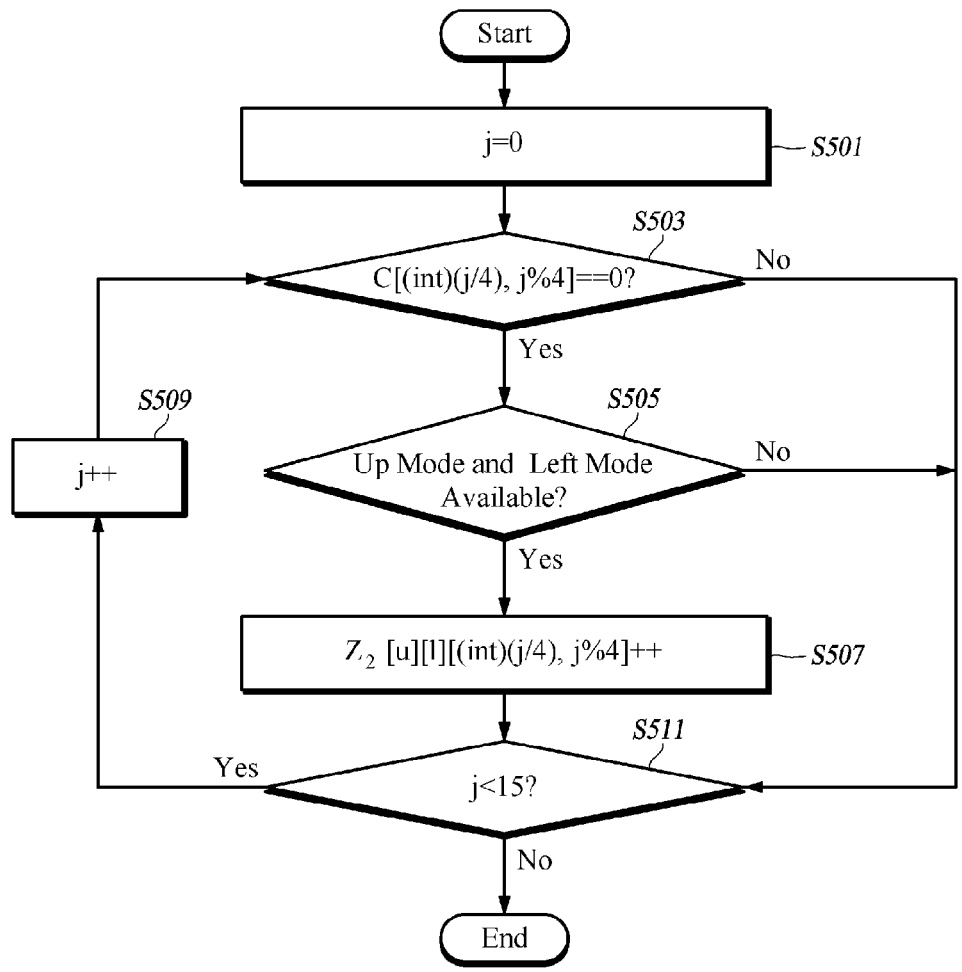
FIG. 5 is a flowchart of a zero count process according to at least another embodiment of the present disclosure.
Figure 6:
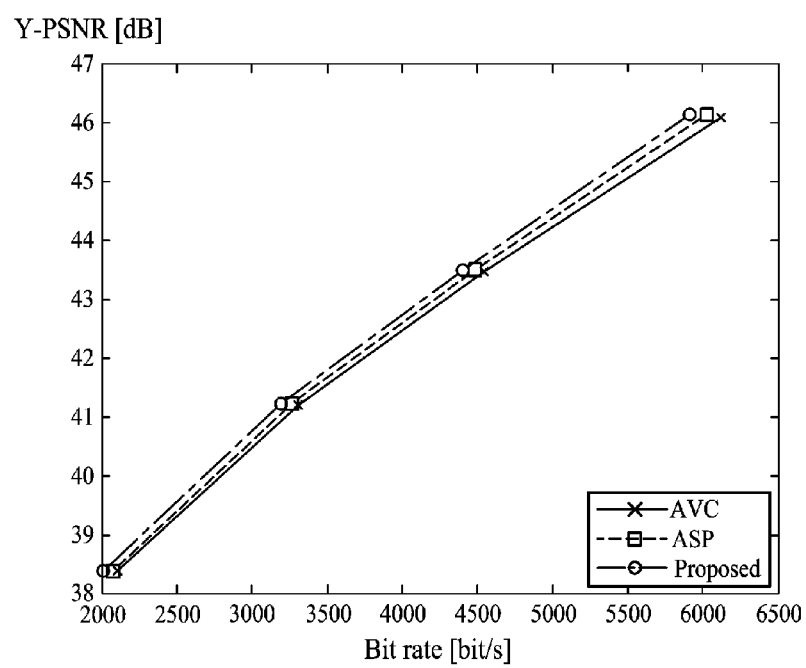
FIGS. 6 to 10 are diagrams of results obtained by comparing the adaptive scan method according to embodiments of the present disclosure with the conventional scan method.
Figure 7:
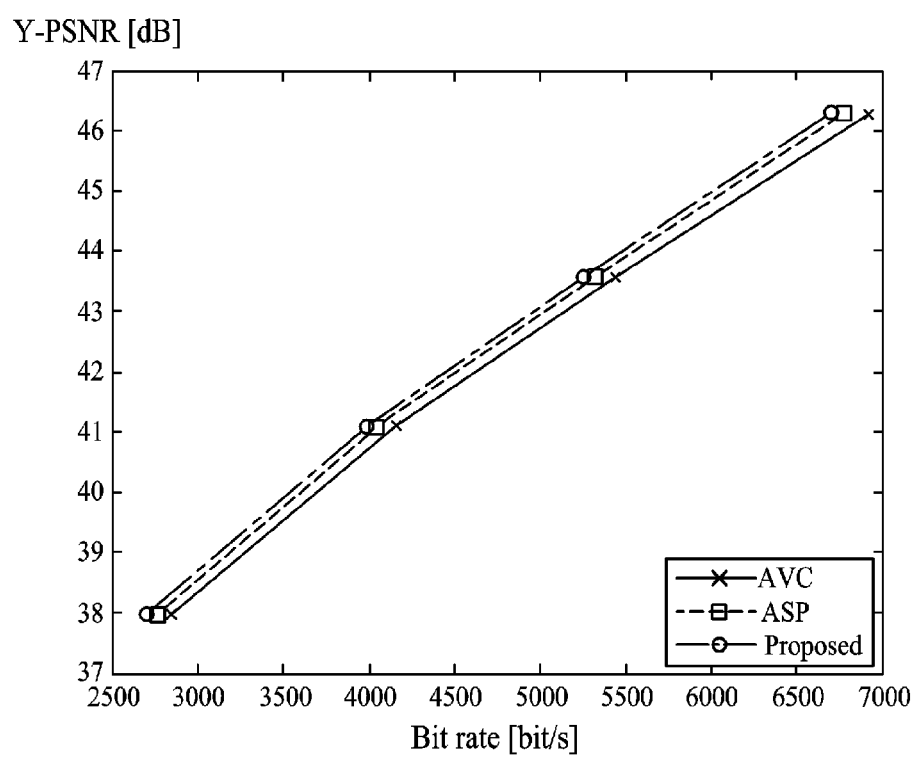
Figure 8:
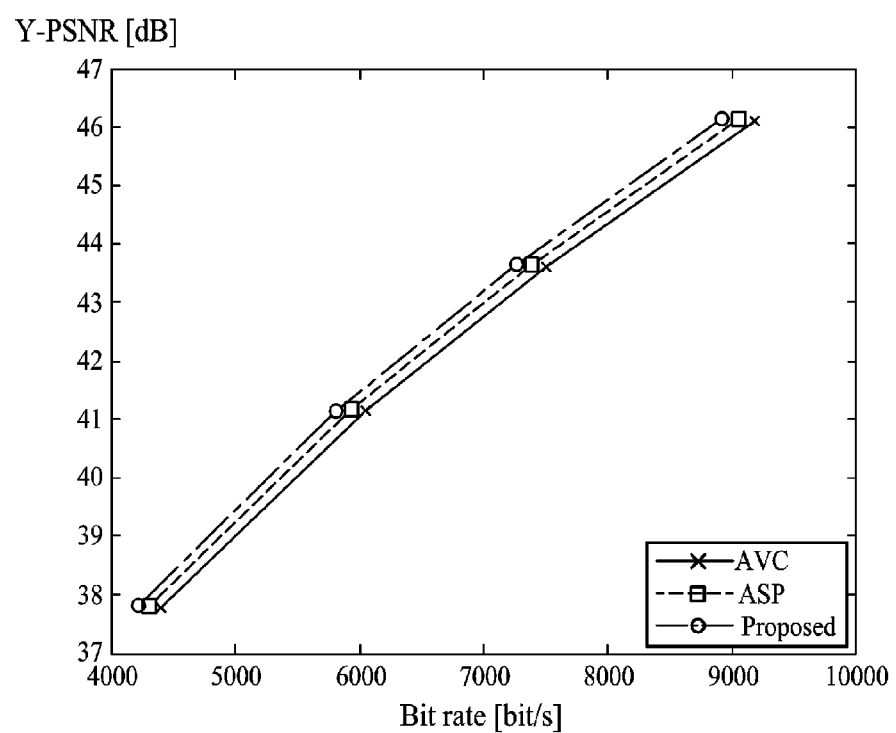
Figure 9:
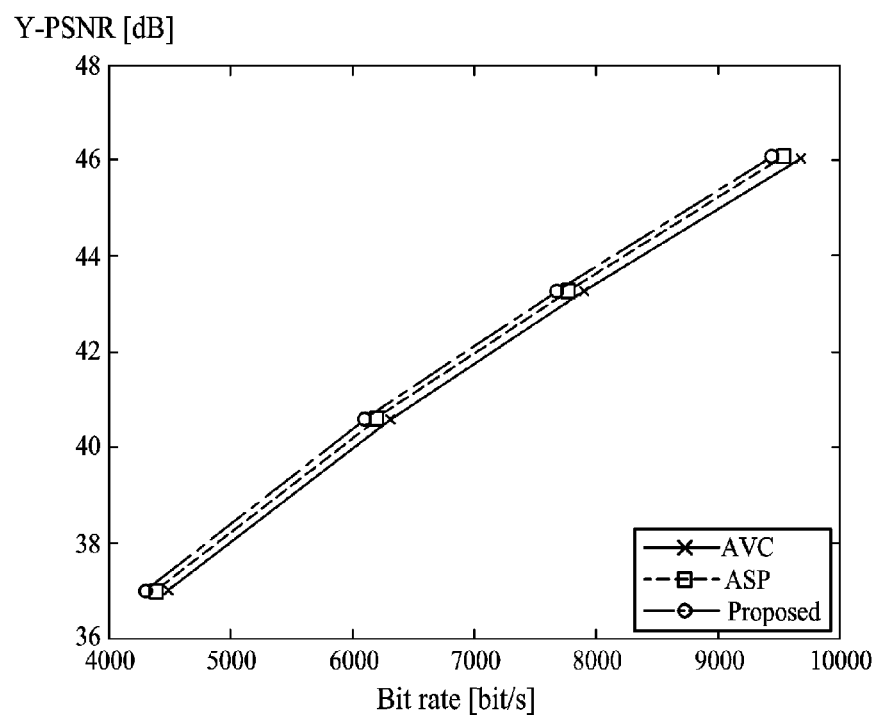
Figure 10:
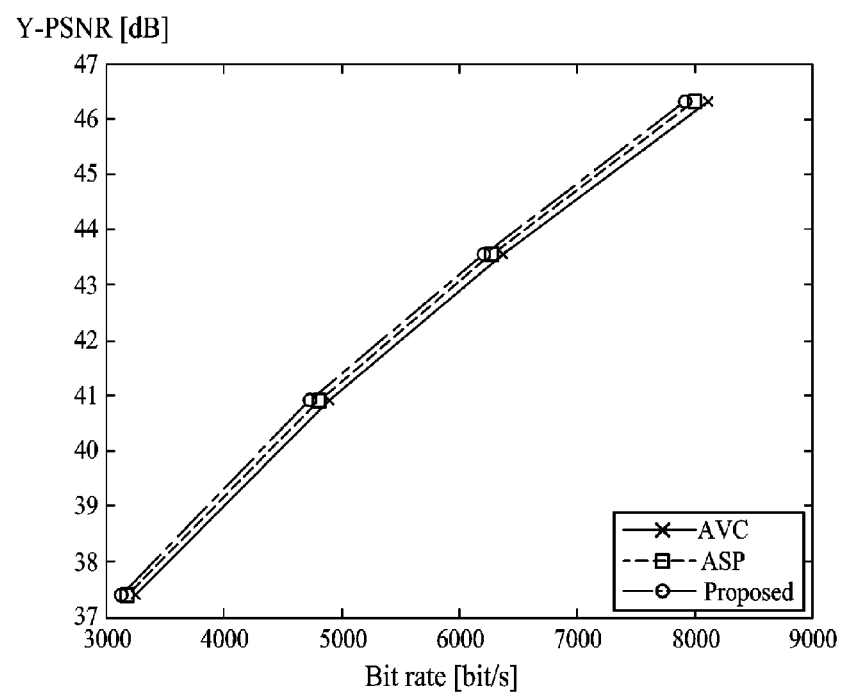

Referring to FIG. 4, after a zero coefficient counter 362 initializes zero counters for each prediction mode of upper blocks and left blocks of current blocks, for the current blocks in a size of 4×4, 8×8 or 16×16 (S401); and, after encoding the current blocks, the scan patterns are updated by increasing the zero counter equal to the corresponding position by 1 in case when the coefficients of the block to the current blocks are 0 (S403). Such updated scan patterns are used for updating the following macro blocks (S405). At this time, the update process for the zero counter $Z[u][l][m, n]$ may be implemented as shown in FIG. 5 (S407). For example, after each coefficient of 4×4 block, 8×8 block or 16×16 block for a specific zero counter $Z_2$ is initialized and a variable j used for identify locations of quantized coefficients $C[m*,n*]$ is set to 0 (S501), the quantized coefficients $C[m*,n*]$ are checked whether they are 0 to increase the corresponding $Z_2[u][l][m*,n*]$, wherein m* is (int)(j/4) and n* is j % 4 (S503) and if intra modes to be used for the upper blocks and the left blocks of the current blocks exist (S505), the zero counter $Z_2[u][l][m*, n*]$ is increased by 1 using the prediction mode information 'u' used for the upper block and the prediction mode information 'l' used for encoding the left blocks to the positions m* and n* where the coefficient values are '0' in the current coded blocks (S507). The variable j is checked whether it is less than 15 (S511). If the variable j is less than 15, the variable j is increased by 1 so that the updates of the zero counters are sequentially performed for each position of the 4×4 blocks (S509), and it is finished when the updates of the zero counters for each position are finished (i.e., when j=15) (S511).

Referring back to FIG. 4, the entropy encoding for the frame or the slices are performed by sequentially updating the zero counters by unit of 4×4 block in the macro blocks (S409).

In order to evaluate the performance for embodiments of the present invention, a test is performed in a sequence in the size of several common intermediate formats (CIF) for 100 frames. The simulation is performed by reference software JM17.0.

An RD optimization is used in the simulation, a context adaptive variable length coding (CAVLC) is used as an entropy encoding method. And also, since embodiments of the present invention are used in the intra encoding, a group of picture (GOP) structure is set as 1 and a size of block for the intra-prediction is fixed to 4×4. The test sequences are encoded into quantization parameters 18, 22, 25 and 28.

In table 1, an average bit rate decrement is calculated based on a Bjontegaard measuring method. FIGS. 6 to 10 depicts results about each sequence used for the Bjontegaard measuring method of table 1. FIGS. 6 to 10 show that in embodiments of the present invention approximately 2.23% of bit rate is reduced in comparison with H.264/AVC and approximately 0.49% of bit rate is reduced in comparison with the ASP algorithm.

TABLE 1

|  | ΔBit-rate (%) | | ΔBD-PSNR (dB) | |
| --- | --- | --- | --- | --- |
| Sequence | ASP | Proposed | ASP | Proposed |
| Forman | −1.44 | −2.15 | 0.15 | 0.20 |
| Container | −2.13 | −2.36 | 0.18 | 0.21 |
| Paris | −1.74 | −2.09 | 0.19 | 0.23 |
| Bus | −1.77 | −2.24 | 0.20 | 0.26 |
| Table | −1.57 | −2.32 | 0.16 | 0.23 |
| Average | −1.73 | −2.23 | 0.176 | 0.26 |

According to the present disclosure as described above, the bit rate can be reduced in comparison with the known H.264/AVC and ASP algorithm by using the scan patterns adaptively updated according to the probability distribution of the quantized remaining data in place of using a known zig-zag scan pattern in the intra-prediction coding and/or decoding to thereby increase the compression efficiency of the moving picture.

In addition, according to the present disclosure as described above, the efficiencies of entropy coding and decoding can be increased by updating the scan patterns according to the probability distribution functions (PDFs) of the quantized coefficients of the previous macro blocks.

Some embodiments as described above may be implemented in the form of one or more program commands that can be read and executed by a variety of computer systems and be recorded in any non-transitory, computer-readable recording medium. The computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure have been described for illustrative purposes, those skilled in the art will appreciate that various modifications, additions and substitutions are possible, without departing from the various characteristics of the disclosure. That is, it is understood that the present disclosure should not be limited to these embodiments but various changes and modifications can be made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have not been described for limiting purposes. Accordingly, the scope of the claimed invention is not to be limited by the above embodiments but by the claims and the equivalents thereof.

The invention claimed is:

1. An adaptive scan apparatus, comprising:
  a zero coefficient counter configured to
    generate a zero counter corresponding to intra prediction modes of neighboring blocks of a previous block, wherein the previous block is a block coded before a current block to be encoded, an intra prediction mode of an upper neighboring block of the previous block is same as an intra prediction mode of an upper neighboring block of the current block, and an intra prediction mode of a left neighboring block of the previous block is same as an intra prediction mode of a left neighboring block of the current block, and
    update the zero counter corresponding to a position where a coefficient value of the current block is 0 for transformed and quantized data of the current block; and
  a scan pattern updater configured to update a scan pattern of the current block by sequentially arranging count values of the zero counter from a position of a small value of the count values to a position of a large value of the count values.

2. The adaptive scan apparatus of claim 1, wherein the zero coefficient counter is configured to generate the zero counter by at least one of 4×4 block unit, 8×8 block unit or 16×16 block unit.

3. An adaptive scan method performed by an adaptive scan apparatus, the method comprising:
  generating a zero counter corresponding to intra prediction modes of neighboring blocks of a previous block, wherein the previous block is a block coded before a current block to be encoded, an intra prediction mode of an upper neighboring block of the previous block is same as an intra prediction mode of an upper neighboring block of the current block, and an intra prediction mode of a left neighboring block of the previous block is same as an intra prediction mode of a left neighboring block of the current block;
  determining whether the current block has a coefficient value of 0 for transformed and quantized data of the current block;
  updating, the zero counter corresponding to a position where the coefficient value is 0; and
  updating a scan pattern of the current block by sequentially arranging count values of the zero counter from a position of a small value of the count values to a position of a large value of the count values.

4. The method of claim 3, wherein the generating of the zero counter generates the zero counter by at least one of 4×4 block unit, 8×8 block unit or 16×16 block unit.

5. The method of claim 3, wherein the updating of the scan pattern uses a zig-zag scan pattern when intra prediction mode information of the at least one the neighboring blocks of the current block is unavailable.

6. The method of claim 3, wherein the updating of the scan pattern uses a zig-zag scan pattern for a first block appearing after the zero counter is initialized.

7. An intra-prediction coding apparatus, comprising:
  an intra predictor configured to predict pixel values of a current block by using neighboring pixels of at least one of neighboring blocks of the current block, by using an intra prediction mode of the current block;
  a zero coefficient counter configured to
    generate a zero counter corresponding to intra prediction modes of neighboring blocks of a previous block, wherein the previous block is a block coded before a current block an intra prediction mode of an upper neighboring block of the previous block is same as an intra prediction mode of an upper neighboring block of the current block, and an intra prediction mode of a left neighboring block of the previous block is same as an intra prediction mode of a left neighboring block of the current block, and update the zero counter corresponding to a position where a coefficient value of the current block is 0 for transformed and quantized data of the current block; and a scan pattern updater configured to update a scan pattern of the current block by sequentially arranging count values of the zero counter from a position of a small value of the count values to a position of a large value of the count values.

8. The intra-prediction coding apparatus of claim 7, further comprising:

a transformer configured to perform a block based transform or an image based transform for difference values between the predicted pixel values and pixel values of the current block to transform pixel values corresponding to the difference values.

9. The intra-prediction coding apparatus of claim 8, further comprising:

a quantizer configured to quantize data corresponding to the pixel values transformed by the transformer into an integer level and rearrange the data; and an entropy encoder configured to perform entropy coding for the quantized data.

* * * * *